United States Patent
Jie et al.

(10) Patent No.: US 12,141,193 B2
(45) Date of Patent: Nov. 12, 2024

(54) IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Zequn Jie, Shenzhen (CN); Li Yuan, Shenzhen (CN); Jiashi Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 519 days.

(21) Appl. No.: 17/408,880

(22) Filed: Aug. 23, 2021

(65) Prior Publication Data
US 2021/0382937 A1    Dec. 9, 2021

Related U.S. Application Data

(63) Continuation of application No. PCT/CN2020/092834, filed on May 28, 2020.

(30) Foreign Application Priority Data

Jun. 6, 2019 (CN) .......................... 201910492017.6

(51) Int. Cl.
*G06F 16/55*    (2019.01)
*G06F 16/583*    (2019.01)
(Continued)

(52) U.S. Cl.
CPC .......... *G06F 16/55* (2019.01); *G06F 16/5846* (2019.01); *G06F 16/9014* (2019.01); *G06N 3/02* (2013.01)

(58) Field of Classification Search
CPC ................. G06F 16/55; G06F 16/5846; G06F 16/9014; G06F 16/583; G06F 16/532;
(Continued)

(56) References Cited

U.S. PATENT DOCUMENTS

2014/0201126 A1\* 7/2014 Zadeh .................... A61B 5/165
706/52
2017/0147868 A1    5/2017 Sun et al.
(Continued)

FOREIGN PATENT DOCUMENTS

CN    108491528    9/2018
CN    109145143    1/2019
(Continued)

OTHER PUBLICATIONS

English translation of International Search Report issued in PCT/CN2020/092834 on Aug. 26, 2020.

*Primary Examiner* — Christopher M Brandt
(74) *Attorney, Agent, or Firm* — Crowell & Moring LLP (57) ABSTRACT

Embodiments of this disclosure include an image processing method and apparatus. The method may include obtaining feature points corresponding to training images and feature center points of images in a second quantity of categories and obtaining a feature condition probability distribution that the feature points collide with corresponding feature center points. The method may further include performing network training to obtain target feature center points of the images in the second quantity of categories. The method may further include mapping the first quantity of feature points and the second quantity of target feature center points to a Hamming space, to obtain hash codes of the first quantity of training images and hash center points of the images in the second quantity of categories. The method may further include performing network training using the
(Continued)

hash condition probability distribution and the ideal condition probability distribution, to obtain an image hash model.

10 Claims, 6 Drawing Sheets

(51) Int. Cl.
*G06F 16/901* (2019.01)
*G06N 3/02* (2006.01)

(58) Field of Classification Search
CPC ........ G06F 16/51; G06F 18/214; G06F 18/22; G06N 3/02; G06N 3/045; G06N 3/08
See application file for complete search history.

(56) References Cited

U.S. PATENT DOCUMENTS

| | | | |
|---|---|---|---|
| 2019/0171665 A1* | 6/2019 | Navlakha | G06V 10/761 |
| 2020/0104632 A1* | 4/2020 | Liu | G06N 3/08 |

FOREIGN PATENT DOCUMENTS

| | | |
|---|---|---|
| CN | 109241327 | 1/2019 |
| CN | 110188223 | 8/2019 |

\* cited by examiner

IMAGE PROCESSING METHOD AND APPARATUS, AND STORAGE MEDIUM

CROSS-REFERENCE TO RELATED APPLICATION

This application is a continuation application of PCT Patent Application No. PCT/CN2020/092834, filed on May 28, 2020, which claims priority to Chinese Patent Application No. 201910492017.6, entitled "IMAGE PROCESSING METHOD AND APPARATUS, AND COMPUTER DEVICE" and filed with the National Intellectual Property Administration, PRC on Jun. 6, 2019, wherein the content of each of the above-referenced applications is incorporated herein by reference in its entirety.

FIELD OF THE TECHNOLOGY

This application relates to the field of image retrieval technologies, and specifically, to an image processing method and apparatus, and a storage medium.

BACKGROUND OF THE DISCLOSURE

With gradual growth of images on the Internet, how to quickly and accurately provide required image resources for users has become increasingly important. Currently, a commonly used image retrieval method is to describe contents of images by extracting underlying characteristics of the images, and then determine whether the images are similar images through feature comparison.

To improve retrieval accuracy, image features of thousands of dimensions usually need to be extracted, which requires a huge storage space for storing an image feature library. In addition, a workload of each feature comparison is heavy, which greatly decelerates the retrieval.

SUMMARY

In view of this, embodiments of this disclosure provide an image processing method and apparatus, and a storage medium, to train an image hash model in a center collision manner, thereby greatly improving a training effect and training accuracy.

To achieve the foregoing objective, the embodiments of this disclosure provide the following technical solutions.

This disclosure provides an image processing method, performed by an image processing system. The method may include receiving description information of a retrieval target and determining a target hash code from an image hash code database according to the description information. Each hash code in the image hash code database may be obtained by learning an image using an image hash model. The image hash model may enable similar images to be projected to a same center point in a space. The method may further include determining the retrieval target from an image library according to the target hash code and a correspondence between images in the image library and the hash codes in the image hash code database.

This disclosure provides an image processing method, performed by an image processing system. The method may include obtaining a first quantity of training images and obtaining, using a convolutional neural network (CNN), feature points that respectively correspond to the first quantity of training images in a feature embedding space and respective feature center points of images in a second quantity of categories to which the first quantity of training images belong. The method may further include obtaining a feature condition probability distribution that the first quantity of feature points collide with corresponding feature center points and a preset ideal condition probability distribution, and performing network training using the feature condition probability distribution and the ideal condition probability distribution, to obtain respective target feature center points of the images in the second quantity of categories. The method may further include separately mapping the first quantity of feature points and the second quantity of target feature center points to a Hamming space, to obtain respective hash codes of the first quantity of training images and respective hash center points of the images in the second quantity of categories. The method may further include obtaining a hash condition probability distribution that the first quantity of hash codes collide with corresponding hash center points and performing network training using the hash condition probability distribution and the ideal condition probability distribution, to obtain an image hash model.

This disclosure further provides an image processing apparatus, including a memory operable to store computer-readable instructions and a processor operable to read the computer-readable instructions. The processor when executing the computer-readable instructions may be configured to receive description information of a retrieval target and determine a target hash code from an image hash code database according to the description information. Each hash code in the image hash code database may be obtained by learning an image using an image hash model. The image hash model may enable similar images to be projected to a same center point in a space. The processor may be configured to determine the retrieval target from an image library according to the target hash code and a correspondence between images in the image library and the hash codes in the image hash code database.

This disclosure further provides an image processing apparatus, including a memory operable to store computer-readable instructions and a processor operable to read the computer-readable instructions. The processor when executing the computer-readable instructions may be configured to obtain a first quantity of training images and obtain, using a convolutional neural network (CNN), feature points that respectively correspond to the first quantity of training images in a feature embedding space and respective feature center points of images in a second quantity of categories to which the first quantity of training images belong. The processor may further be configured to obtain a feature condition probability distribution that the first quantity of feature points collide with corresponding feature center points and a preset ideal condition probability distribution, and perform network training using the feature condition probability distribution and the ideal condition probability distribution, to obtain respective target feature center points of the images in the second quantity of categories. The processor may further be configured to separately map the first quantity of feature points and the second quantity of target feature center points to a Hamming space, to obtain respective hash codes of the first quantity of training images and respective hash center points of the images in the second quantity of categories. The processor may further be configured to obtain a hash condition probability distribution that the first quantity of hash codes collide with corresponding hash center points and perform network training using the hash condition probability distribution and the ideal condition probability distribution, to obtain an image hash model.

This disclosure further provides a non-transitory computer-readable storage medium, having processor executable instructions stored thereon. The instructions may cause the processor to receive description information of a retrieval target and determine a target hash code from an image hash code database according to the description information. Each hash code in the image hash code database may be obtained by learning an image using an image hash model. The image hash model may enable similar images to be projected to a same center point in a space. The instructions may further cause the processor to determine the retrieval target from an image library according to the target hash code and a correspondence between images in the image library and the hash codes in the image hash code database.

This disclosure further provides a non-transitory computer-readable storage medium, having processor executable instructions stored thereon. The instructions may cause the processor to obtain a first quantity of training images and obtain, using a convolutional neural network (CNN), feature points that respectively correspond to the first quantity of training images in a feature embedding space and respective feature center points of images in a second quantity of categories to which the first quantity of training images belong. The instructions may further cause the processor to obtain a feature condition probability distribution that the first quantity of feature points collide with corresponding feature center points and a preset ideal condition probability distribution, and perform network training using the feature condition probability distribution and the ideal condition probability distribution, to obtain respective target feature center points of the images in the second quantity of categories. The instructions may further cause the processor to separately map the first quantity of feature points and the second quantity of target feature center points to a Hamming space, to obtain respective hash codes of the first quantity of training images and respective hash center points of the images in the second quantity of categories. The instructions may further cause the processor to obtain a hash condition probability distribution that the first quantity of hash codes collide with corresponding hash center points and perform network training using the hash condition probability distribution and the ideal condition probability distribution, to obtain an image hash model.

Based on the foregoing technical solutions, the embodiments of this disclosure provide an image processing method. In this method, images in an image library are processed based on an image hash model trained by using a principle that similar images are projected to the same center point in a space (for example, a feature space and/or a Hamming space), to obtain hash codes of the images, so as to obtain an image hash code database. During image retrieval, image features are replaced with the hash codes for retrieval, thereby improving retrieval efficiency.

Further, the image hash model learns similarities between image feature points and a center point of a category of images formed by similar images, instead of similarities between images. Therefore, a global distribution of the images can be learned, and quality of the hash codes can be improved, thereby improving retrieval accuracy. In addition, complexity of learning of the image hash model is greatly reduced, and a training time is shortened, thereby improving learning efficiency.

BRIEF DESCRIPTION OF THE DRAWINGS

To describe the technical solutions in the embodiments of this disclosure or the related art more clearly, the following briefly describes the accompanying drawings required for describing the embodiments or the related art. Apparently, the accompanying drawings in the following descriptions show merely some embodiments of this disclosure, and a person of ordinary skill in the art may still derive other drawings from these accompanying drawings without creative efforts.

DESCRIPTION OF EMBODIMENTS

The inventor of this disclosure found that, in application of an existing image retrieval method based on a hash algorithm, for n to-be-retrieved images, time complexity thereof is $O(\log(n!))$; and in actual application scenarios, a value of n is usually very large, which makes it difficult to learn a global distribution of images.

The inventor noticed that, a significant improvement can be achieved in accuracy of many computer vision tasks such as image classification, object recognition, and face recognition by using deep learning algorithms such as a CNN. The CNN can be well applicable to a content-based image retrieval (CBIR) task based on its feature extraction capability. Therefore, this disclosure proposes to combine a CNN and the image retrieval method based on a hash algorithm, that is, map an image into a low-dimensional feature by training a CNN, and then convert the feature into a binary code for retrieval, to achieving an objective of improving retrieval accuracy and retrieval efficiency.

In addition, the inventor noticed that in the related image library retrieval method, regardless of directly calculating similarities between images by using image features or calculating similarities between images by using hash codes to implement model training, the process is data processing between sample images, and requires a large amount of time for learning, causing high time complexity of image library retrieval.

Based on the above analysis, this disclosure proposes to design, based on a commonly used hash algorithm, a hash method based on learnable dynamic data center similarities, to implement a more accurate and efficient image processing solution that can be applied to an image retrieval application scenario.

The method is based on a geometrical principle, that is, when all similar data is projected to the same point in a space (for example, a feature space and/or a Hamming space), and dissimilar data is projected to different points in the space, ideal hash codes of the data may be obtained, and image library retrieval with high accuracy can be implemented by using the hash codes in an ideal state.

Specifically, in this disclosure, a series of center points may be learned in the feature space for training images. The center points may be referred to as feature center points, and the feature center points retain semantic information of images and similarities between original images. Subsequently, collision, that is, center collision, may be performed on a feature point of each training image and a corresponding feature center point thereof (that is, a feature center point of a category to which the image feature point belongs). Collision is derived from library collision. In the embodiments of this disclosure, that a feature point of a training image collides with a corresponding feature center point thereof means that a similarity between the feature point and the feature center point reaches a preset threshold. In other words, images in each category correspond to one feature center point, and for a to-be-retrieved image, a feature point of the to-be-retrieved image may be directly compared with the feature center point, to quickly recognize a category to which the to-be-retrieved image belongs. A required image can be quickly retrieved based on the category.

In addition, in this disclosure, obtained feature points of training images and obtained feature center points may alternatively be mapped to the Hamming space by using a hash layer, to obtain hash codes corresponding to the training images and hash center points corresponding to the feature center points. In the foregoing manner, center collision may also occur in the Hamming space. In this way, center collision occurs in both the feature space and the Hamming space, so that consistence of center similarities is maintained in the feature space and the Hamming space.

In this disclosure, the foregoing concept is applied to large-scale image library retrieval, and compared with the related image library retrieval method based on a hash algorithm (for example, the method described in the foregoing background part), a global distribution of data can be learned, and similarity information can be learned from a plurality of data points in each center collision hash, which greatly improves learning efficiency and shortens a training time, thereby improving image retrieval efficiency and accuracy.

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

An image processing method provided in the embodiments of this disclosure may be applied to an image processing system. The image processing system may be deployed in a cloud computing cluster (including at least one cloud computing device), and is provided to a user for use in an artificial intelligence (AI) cloud service manner, where the AI cloud service is also generally referred to as AI as a service (AIaaS). Specifically, the user creates an example of the image processing system in the cloud computing cluster by using a browser, and then implements image processing through example interaction between the browser and the image processing system.

In some implementations, the image processing system may alternatively be deployed in a physical device, for example, a terminal and/or a server, and is provided to the user for use in a form of a client. Specifically, the terminal may obtain a package of the image processing system, and then run the package, to deploy the client of the image processing system on the terminal. The terminal runs the client, to implement image processing. Certainly, in some cases, the terminal runs the client, and interacts with a server side of the image processing system deployed on the server, to implement image processing.

In order to make the technical solutions of this disclosure clearer and easy to understand, the following describes the image processing method provided in this disclosure from a perspective of the image processing system.

Figure 1A:
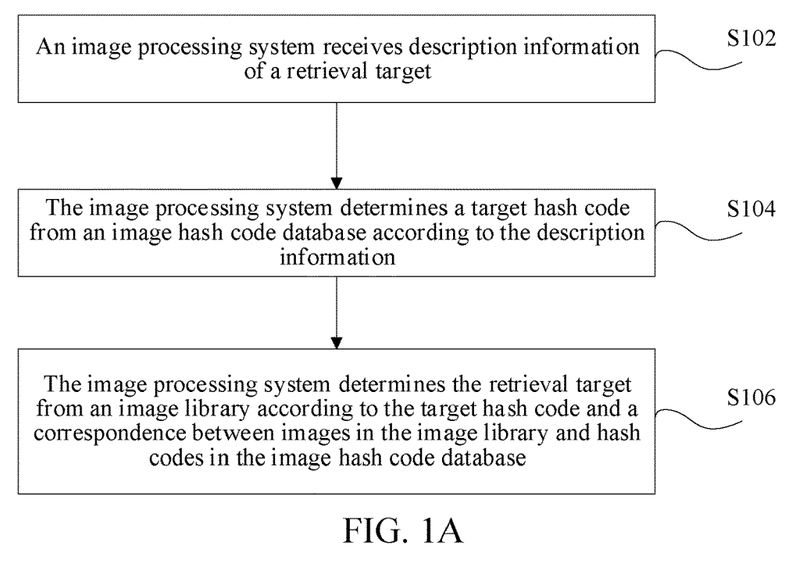
FIG. 1A is a schematic flowchart of an image processing method according to an embodiment of this disclosure.

Referring to a flowchart of an image processing method shown in FIG. 1A, the method includes the following steps:

S102: An image processing system receives description information of a retrieval target.

The retrieval target refers to an image that needs to be retrieved. In an image retrieval scenario, to retrieve the image that needs to be retrieved, a user may input the description information of the retrieval target by using a graphical user interface (GUI). The description information may be in a form of text or an image. That is, the method supports image retrieval in a form of text, or image retrieval in a form of an image.

When the description information of the target is in a form of text, the description information may be at least one sentence. For example, the description information may be "It's a nice day today. A cibotium barometz is cheerfully playing on the grass." In some implementations, the description information may alternatively be at least one key word. For example, the description information may be "sunny day, grass, cibotium barometz, playing".

When the description information of the target is in a form of an image, the image is specifically an image similar to the retrieval target, or even may be an image the same as the retrieval target. For example, the description information may be an image having a relatively low definition or an image with a watermark. The user may input the description information for retrieval, to obtain an image having a relatively high definition or an image without a watermark.

In some implementations, the user may input the description information by using a speech. For example, the user may input a sentence, a key word, or an address of an input image by using a speech. The image processing system may convert the speech into text, or obtain the input image according to the address of the input image in the speech, and retrieve an image using the text, or retrieve an image using the input image.

In some implementations, an application may alternatively retrieve an image by using the image processing system. Specifically, the image processing system may also receive the description information of the retrieval target that is sent by the application.

S104: The image processing system determines a target hash code from an image hash code database according to the description information.

Each hash code in the image hash code database is obtained by learning an image by using an image hash model, the image hash model being a mathematical model that enables similar images to be projected to the same center point in a space.

Images in each category correspond to one center point. Based on that spaces to which similar images are projected are different, the center point may further be classified into a different category. For example, when similar images are projected to a feature space, the center point is a feature center point; and when similar images are projected to a Hamming space, the center point is a hash center point. Based on this, in some implementations, images in each category may correspond to one feature center point and/or one hash center point.

The image processing system may determine a center point (for example, a feature center point or a hash center point) corresponding to the description information based on the description information, and then determine a target hash code based on the center point.

Specifically, when the description information is in a form of text, the image processing system may determine, according to the description information, a category to which the retrieval target belongs, then determine a hash center point corresponding to the category, and determine the target hash code from the image hash code database according to the hash center point.

When the description information is in a form of an image, the image processing system may determine a hash code corresponding to the image. Specifically, the image processing system inputs the image into the image hash model, to obtain the hash code. The hash code may be referred to as a reference hash code. Then the image processing system may determine, from the image hash code database, the target hash code matching the reference hash code. Specifically, the image processing system may determine a hash code near the reference hash code (that is, a hash code with a distance to the reference hash code within a preset range) as the target hash code.

S106: The image processing system determines the retrieval target from an image library according to the target hash code and a correspondence between images in the image library and the hash codes in the image hash code database.

The hash codes in the image hash code database and the images in the image library are in a one-to-one correspondence. The image processing system may determine, according to the correspondence and from the image library, an image matching the target hash code, as the retrieval target. The image matching the target hash code may be an image corresponding to the target hash code.

In some implementations, the image processing system may alternatively display the retrieval target by using the GUI, for the user to view.

In the embodiment shown in FIG. 1A, the key for image processing lies in the image hash model. The image hash model may be obtained through training. Specifically, the image processing system may construct an initial image hash model, the initial image hash model including a feature extraction network and a feature embedding network.

The feature extraction network is configured for extracting features of images. The feature extraction network may be a CNN, a recurrent neural network (RNN), a deep neural network (DNN), or the like.

The feature embedding network includes a feature embedding layer and a hash layer. The feature embedding layer is configured for projecting the features extracted by the feature extraction network to an embedding space (that is, the feature space), to obtain feature points. The hash layer is configured for projecting the feature points to the Hamming space. The hash layer may include a plurality of fully connected layers, and may further include a hyperbolic tangent function after the plurality of fully connected layers, to integrate continuous vectors into a binarized vector.

A loss function (which may alternatively be referred to as a target function) of the initial image hash model may be determined according to a first loss function used for projecting similar images to the feature space and/or a second loss function used for projecting similar images to the Hamming space. If center collision is only performed in the feature space, the loss function of the initial image hash model is determined according to the first loss function. If center collision is only performed in the Hamming space, the loss function of the initial image hash model is determined according to the second loss function. If center collision is performed in both the feature space and the Hamming space, the loss function of the initial image hash model is determined according to the first loss function and the second loss function.

Subsequently, the image processing system inputs the initial image hash model according to training images, and updates parameters of the initial image hash model by using a loss value determined by using the loss function, to train the initial image hash model to obtain the image hash model.

The first loss function may be determined according to a feature condition probability distribution and an ideal condition probability distribution. The feature condition probability distribution is used for representing a probability that a feature point is projected to a feature center point.

The second loss function may be determined according to a hash condition probability distribution and an ideal condition probability distribution. The hash condition probability distribution is used for representing a probability that a hash code is projected to a hash center point.

In some implementations, the loss function of the initial image hash model is determined according to the first loss function used for projecting similar images to the feature space, the second loss function used for projecting similar images to the Hamming space, and a third loss function used for binarizing feature vectors of the feature space.

The foregoing mainly describes the image processing method from a perspective of user interaction, and the following describes the image processing method from a perspective of technologies.

Figure 1B:
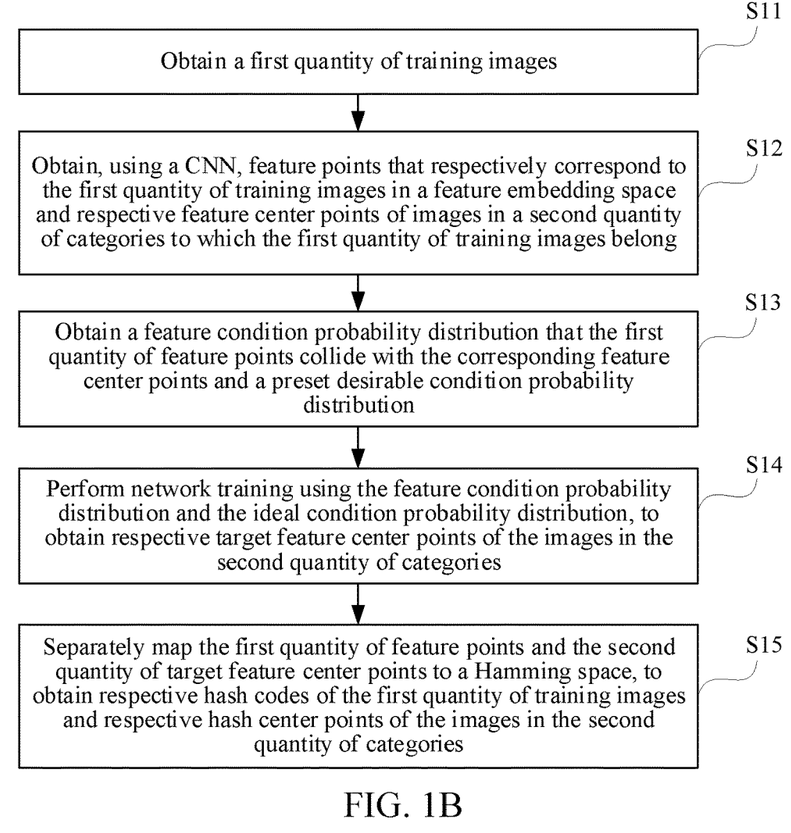
FIG. 1B is a schematic flowchart of an image processing method according to an embodiment of this disclosure.

FIG. 1B is a schematic flowchart of an image processing method according to an embodiment of this disclosure. The method provided in this embodiment may be applied to a computer device. The computer device may be a server or a terminal device. A product type of the computer device is not limited in this disclosure. In addition, this embodiment mainly describes a training process of an image hash model used in an image retrieval application scenario, that is, an implementation process of obtaining the image hash model through training in a center collision manner. As shown in FIG. 1B, the method may include, but not limited to, the following steps:

Step S11: Obtain a first quantity of training images.

A source of the training images is not limited in this application. For ease of description on the technical solutions, in this embodiment, the first quantity of training images may be sequentially recorded as $\{x_1, x_2, \ldots, x_i, \ldots, x_n\}$. It can be seen that the first quantity may be recorded as n. A specific value of n is not limited in this embodiment.

In this embodiment, an image library formed by the n training images may be recorded as a training image library, and before model training, a second quantity of image categories included in the n training images may be determined in advance. The second quantity may be recorded as z, and a specific value thereof is not limited.

In addition, in this disclosure, each training image in the training image library may further be annotated according to an image category, to obtain a label $l_i$ corresponding to each training image. Therefore, correspondingly annotated labels of the n training images may be recorded as $\{l_1, l_2, \ldots, l_i, \ldots, l_n\}$, and for similar training images, for example, $x_i$ and $x_j$, in the n training images, annotated labels of the two training images may be the same, that is, $l_i=l_j$. Correspondingly, the indicator function used for indicating whether the training images are similar meets $\delta(l_i, l_1)=1$; otherwise, the indicator function is 0. It can be seen that the same label may be annotated on training images of the same category.

A method for determining labels of the training images is not limited in this disclosure. In actual application, after a group of numbers of a label of a training image are determined, the label may always be used for calculation of condition probabilities subsequently, Step S12: Obtain, according to a CNN, feature points that respectively correspond to the first quantity of training images in a feature embedding space and respective feature center points of images in a second quantity of categories to which the first quantity of training images belong.

In this embodiment, the first quantity of training images may be sequentially inputted into the CNN, to obtain image features of the training images, and then map the image features to the feature embedding space, to obtain the feature points corresponding to the first quantity of training images. The CNN may include a convolutional layer, a pooling layer, a fully connected layer, and the like. In this embodiment, a plurality of convolutional layers may be used to implement feature extraction on the training images, to obtain the image features.

In addition, a process of mapping the extracted image features to the feature embedding space is actually a dimension reduction process, that is, mapping a high-dimensional feature vector (which is formed by the extracted image features) to a low-dimensional space (that is, the feature space in this embodiment).

A word embedding manner may be used in this embodiment. An embedding model, which may be, but not limited to an embedding module (a bag-of-words model), may be specifically used to convert the high-dimensional feature vector obtained by the CNN into low-dimensional feature vectors. In addition, the method for feature vector dimension reduction provided in this disclosure is not limited to the word embedding manner provided in this disclosure.

In the foregoing manner, in this embodiment, feature points corresponding to the n training images in the feature embedding space may be obtained, and may be sequentially recorded as $\{v_1, v_2, \ldots, v_i, \ldots, v_n\}$. Each feature point may be a multi-dimensional vector, and may be used for representing contents of a corresponding training image. Contents of each feature point are not limited in this disclosure.

For the process of obtaining the feature center points, the feature center points may be obtained by using a learning result of the fully connected layer of the CNN. For example, a parameter vector formed by 1 may be inputted into the fully connected layer, to obtain a feature center point through learning. Generally, the feature center point obtained in this case is usually insufficiently accurate, and network training is further required for further optimizing the feature center point. For a specific implementation process, refer to the descriptions of corresponding parts in the following embodiments.

During a plurality of network training processes, a sum of distances between a feature center point obtained by using the fully connected layer and on which minimization training has been performed by the loss function (for example, a target function provided in the following embodiments) and feature points of training images of the same category is required to be minimized. It can be considered that the currently obtained feature center point is an optimal feature center point of the category of images. For the network training process, refer to the descriptions of corresponding parts in the following embodiments.

Step S13: Obtain a feature condition probability distribution that the first quantity of feature points collide with the corresponding feature center points and a preset ideal condition probability distribution.

In this embodiment, after a feature center point $c_k$ of each category of training images and feature points $v_i$ of the training images are obtained in the foregoing manner, for the feature point $v_i$ of each training image in the category of images, a feature condition probability distribution that the feature point $v_i$ collides with the feature center point $c_k$ of the corresponding category of images may be obtained by using the following formula (1), but not limited to this calculation manner:

$$p(c_k \mid v_i) = \frac{\exp\{-D(v_i, c_k)\}}{\sum_m^z (1 - \delta(l_i, l_m))\exp\{-D(v_i, c_m)\} + \theta}; \quad (1)$$

where $v_i$ may represent a feature point of an $i^{th}$ training image; $c_k$ may represent a feature center point of a $k^{th}$ category of images; $p(c_k|v_i)$ may be a condition probability function, and may specifically represent a condition probability that the feature point $v_i$ collides with a corresponding possible feature center point $c_k$, the feature center point $c_k$ referring to a feature center point of an image category to which training images having the feature point $v_i$ belong; exp{ } may represent an exponential function using a natural number e as a base; DO may represent a distance function used for calculating, for example, a Euclidean distance or another distance parameter, so that $D(v_i, c_k)$ may specifically represent a feature distance between the feature point $v_i$ and the corresponding possible feature center point $c_k$, and $D(v_i, c_m)$ may specifically represent a feature distance between the feature point $v_i$ and a corresponding possible feature center point $c_m$; $\Sigma(\ )$ may be a summation function, where m may be the index of summation $\Sigma$ and may be a value taken from [1, z]. $\delta(li, lm)_i, l_m)$ may be an indicator function indicating whether training images corresponding to labels $l_i$ and $l_m$ respectively are similar, for example, $\delta(l_i, l_m)=1$ may indicate that the two training images are similar, and $\delta(l_i, l_m)=0$ may indicate that the two training images are dissimilar, where the indicator function may be generated before model training, for example, generated when labels are annotated on the training images; and $\theta$ may represent the condition probability configuration parameter, a value of $\theta$ may not be limited in this disclosure, and in actual application, accuracy of the condition probability function may be adjusted by changing the value of $\theta$.

In this embodiment, the condition probability function, namely, formula (1), may specifically be a normal function. A maximum value of the normal function may correspond to the feature center point $c_k$. The feature point $v_i$ of a training image being closer to the feature center point $c_k$ indicates a larger corresponding condition probability. If collision, that is, center collision, occurs between a feature point $v_i$ of a training image and the feature center point $c_k$, a corresponding condition probability may be a maximum value, which indicates that it is determined that the training image belongs to an image category corresponding to the feature center point. Otherwise, a smaller condition probability of a feature point $v_i$ of a training image and the feature center point $c_k$ indicates a larger difference between the training image and an image category corresponding to the feature center point. In other words, the foregoing classification on the image category of the training image may be incorrect, and the training image may not belong to the category of images.

It can be seen that, in this disclosure, accurate classification on training images can be implemented by using the foregoing obtained condition probabilities. An implementation method of step S13 is not limited to the calculation method represented by using formula (1).

In addition, with reference to analysis on the technical concept of this disclosure above, in an ideal case, in the foregoing training image library, similar training images may be projected to a feature center point of images of a corresponding category, and dissimilar training images may be projected to feature center points of images of different categories. An ideal feature condition probability distribution obtained in this way may be:

$$p_0(c_k \mid v_i) = \begin{cases} 1 & 1_i = k \\ 0 & 1_i \neq k \end{cases}; \quad (2)$$

As shown in formula (2), a label $1_i$ of a training image is equal to a corresponding image category k. A feature point of the training image collides with a feature center point of the category of images. The training image belongs to the category of images. Therefore, if $p(c_k|v_i)=p_0(c_k|v_i)$, $(\forall i,k)$ it indicates that feature points of all similar training images collide with a corresponding feature center point.

Step S14: Perform network training by using the feature condition probability distribution and the ideal condition probability distribution, to obtain respective target feature center points of the images in the second quantity of categories.

In this disclosure, configuration parameters of the CNN may be adjusted according to a first similarity requirement between the feature condition probability distribution and the ideal condition probability distribution, to obtain the respective target feature center points of the images in the second quantity of categories.

A similarity or matching degree between the feature condition probability distribution and the ideal condition probability distribution may be determined in a manner of a kullback-leibler (KL) divergence. The KL divergence describes a difference between the two probability distributions.

Specifically, in this disclosure, center collision learning may be performed in the foregoing manner, to obtain a more accurate feature center point of each category of training images, that is, to determine a target feature center point of center collision of each category of images. In addition, in this embodiment, the foregoing manner may be used as a target function for center collision learning, that is, to control and implement center collision learning by the target function. The target function (that is, the first loss function described above) may be, but not limited to, a formula (3):

$$L^v_{collapsing} = \sum_{v_i \in B} KL(p_0(c_k \mid v_i) \| p(c_k \mid v_i)) = \quad (3)$$

$$\sum_{v_i \in B} (H(p_0(c_k \mid v_i), p(c_k \mid v_i)) - H(p_0(c_k \mid v_i))) =$$

$$-\sum_{v_i \in B} (p_0 \log p(c_k \mid v_i) + (1 - p_0) \log(1 - p(c_k \mid v_i)));$$

In formula (3), B may represent a set formed by feature points corresponding to the training images.

It can be seen that, in this disclosure, during center collision learning performed by using the target function, after a feature center point is obtained in each time of learning, if a matching degree between a feature condition probability distribution obtained by using the feature center point and the feature points of the training images in the foregoing manner and the ideal feature condition probability distribution does not meet a first condition, it indicates that the feature center point obtained in the current time of learning is insufficiently accurate. Therefore, in this embodiment, the configuration parameter, for example, a weight value, of the CNN may be adjusted, and then a new feature center point is obtained again by using the adjusted configuration parameter. That is, the z obtained feature center points described above are updated until a newly obtained feature condition probability distribution and the ideal condition probability distribution meet the first similarity requirement, and a plurality of finally obtained feature center points are used as target feature center points.

Step S15: Separately map the first quantity of feature points and the second quantity of target feature center points to a Hamming space, to obtain respective hash codes of the first quantity of training images and respective hash center points of the images in the second quantity of categories.

In this embodiment, the feature points corresponding to the first quantity of training images may be mapped to the Hamming space by using a hash layer, to obtain hash codes $h_i$ of the corresponding training images. Similarly, the z obtained target feature center points described above may be inputted into the hash layer, and are mapped to the Hamming space, to obtain corresponding hash center points.

In actual application, it is difficult for data passing through the hash layer to be completely integrated into a binarized vector. In other words, directly obtained hash codes and hash center points by inputting feature points and feature center points into the hash layer may not all be binarized data. Therefore, in this embodiment, the obtained feature points of the training images and the obtained feature center points may be further integrated into binarized data first by using the loss function shown in the following formula (4). The loss function (that is, the third loss function described above) may be:

$$L_Q = \sum_i^n (\||h_i| - 1\|_1) + \sum_i^z (\||c_k^h| - 1\|_1); \quad (4)$$

Step S16: Obtain a hash condition probability distribution that the first quantity of hash codes collide with the corresponding hash center points.

Step S17: Perform network training by using the hash condition probability distribution and the ideal condition probability distribution, to obtain an image hash model.

In this embodiment, a method for implementing hash center collision learning is similar to the foregoing method for implementing the feature center collision learning. For example, the hash condition probability configuration parameter is adjusted according to a second similarity requirement between the hash condition probability distribution and the ideal condition probability distribution. The second similarity requirement may be that a matching degree between the hash condition probability distribution and the ideal condition probability distribution reaches a similarity threshold.

Specifically, a hash condition probability distribution that target hash codes $h_i$ of the training images match the hash center points $c_k^h$ of the images of the corresponding categories may be obtained by using the following formula (5):

$$p(c_k^h \mid h_i) = \frac{\exp\{-D_H(h_i, c_k^h)\}}{\sum_m^z (1 - \delta(l_i, l_m))\exp\{-D_H(h_i, c_m^h)\} + \theta}; \quad (5)$$

where $h_i$ may represent a target hash code of an $i^{th}$ training image; $c_k^h$ may represent a hash center point of a $k^{th}$ category of images; and $\theta$ represents the hash condition probability configuration parameter, where a specific value of $\theta$ is not limited in this disclosure.

In the Hamming space, the target function used for implementing hash center collision learning (that is, the second loss function described above) may be the following formula (6), but not limited to this:

$$L_{collapsing}^h = \sum_{h_i \in B} kl(p_0(c_k^h \mid h_i) \| p(c_k^h \mid h_i)) = \quad (6)$$

$$- \sum_{h_i \in B} (p_0 \log p(c_k^h \mid h_i) + (1 - p_0)\log(1 - p(c_k^h \mid h_i)));$$

Figure 3:
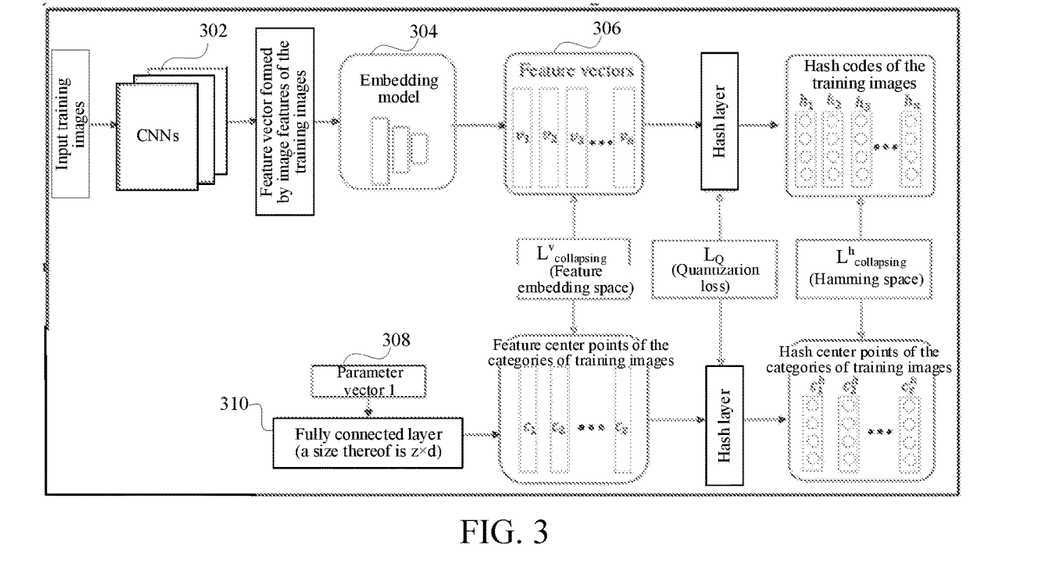
FIG. 3 is a schematic diagram of an image processing application according to an embodiment of this disclosure.

It can be seen that, as shown in FIG. 3, a global target function for performing center collision learning in this disclosure may be:

$$L = L_{collapsing}^v + \lambda_1 L_{collapsing}^h + \lambda_2 L_Q; \quad (7)$$

where $\lambda_1$ and $\lambda_2$ may represent weights of corresponding target functions or loss functions in the global target function, and specific values thereof are not limited.

Therefore, in actual application of this embodiment, after image features of training images are mapped to the feature embedding space, in the feature embedding space, center collision learning may be controlled by using the target function shown in formula (3), to obtain more accurate target feature center points of categories of training images; binarization processing is performed on the target feature center points and the feature points by using the quantification loss function shown in formula (4), and after the processed target feature center points and the processed feature points are mapped to the Hamming space, hash center collision learning may be then controlled in the Hamming space by using the target function shown in formula (6), to obtain more accurate hash codes of the categories of training images. Simultaneously, a hash function used for obtaining optimal feature center points and optimal hash codes of the training images is determined, and used as the image hash model for quickly and accurately obtaining hash codes of input images in actual application.

It can be seen that relative to the manner of learning similarities between hash codes of training images in the related art, in the manner of learning similarities between feature points of training images and corresponding center points in this disclosure, a global distribution of images is learned, and a network training time is greatly shortened, thereby improving learning efficiency and accuracy of image hash codes.

Figure 2:
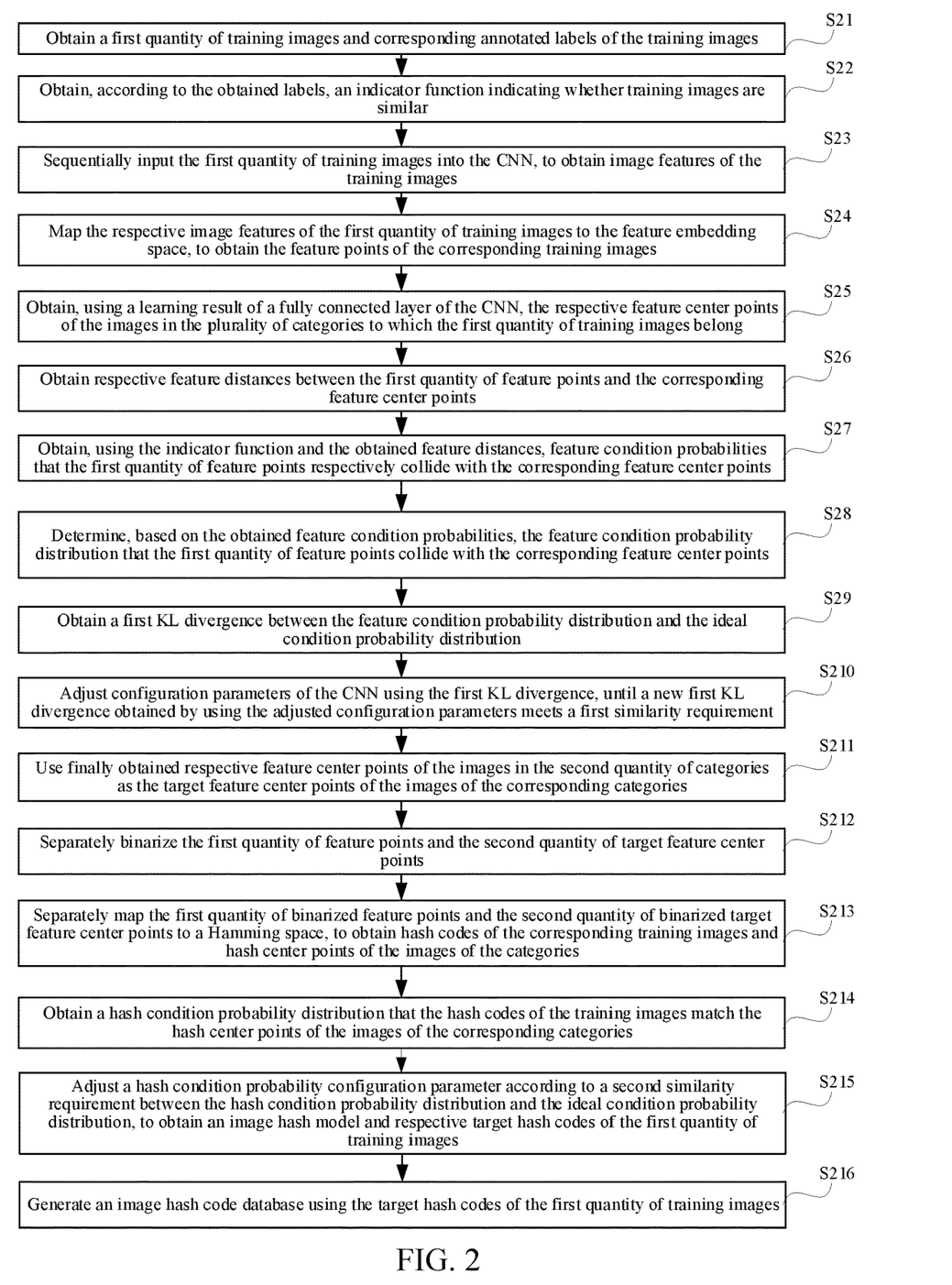
FIG. 2 is a schematic flowchart of another image processing method according to an embodiment of this disclosure.

Referring to a schematic flowchart of a detailed embodiment of an image processing method according to this disclosure shown in FIG. 2 and a schematic diagram of application of the image processing method shown in FIG. 3, a detailed method of the image processing method may include the following steps:

Step S21: Obtain a first quantity of training images and corresponding annotated labels of the training images.

Step S22: Obtain, according to the obtained labels, an indicator function indicating whether training images are similar.

For a manner of determining the labels of the training images and the indicator function $\delta(l_i, l_j)$, refer to the descriptions of corresponding parts in the foregoing embodiments.

Step S23: Sequentially input the first quantity of training images into a CNN 302, to obtain image features of the training images.

Step S24: Map the respective image features of the first quantity of training images to the feature embedding space, to obtain the feature points of the corresponding training images.

Step S25: Obtain, through learning of a fully connected layer of the CNN, the respective feature center points of the images of the plurality of categories to which the first quantity of training images belong.

In this embodiment, following the above description, as shown in FIG. 3, a parameter vector 308 formed by 1 may be inputted into the fully connected layer 310 of the CNN for learning, to generate a feature center point $c_j$ of each category of training images; and the obtained feature center point of each category of training images is used as a vector element, to form a feature center point vector.

A size of the fully connected layer 310 is z×d, and j=1, 2, . . . , z. z represents a quantity of existing feature center points of the n training images, that is, a quantity of categories of training images that are included in the n training images. In other words, training images in one category correspond to one feature center point. d represents a dimension of a feature vector formed by image features extracted by a convolutional layer. Specific values of z and d are not limited in this disclosure. Based on this, the plurality of feature center points obtained in step S25 may be sequentially recorded as $\{c_1, c_2, \ldots, c_z\}$.

Step S26: Obtain respective feature distances between the first quantity of feature points and the corresponding feature center points.

Step 27: Obtain, by using the indicator function and the obtained feature distances, feature condition probabilities that the first quantity of feature points respectively collide with the corresponding feature center points.

Step S28: Determine, based on the obtained feature condition probabilities, the feature condition probability distribution that the first quantity of feature points collide with the corresponding feature center points.

With reference to the condition probability calculation method represented by using formula (1), the feature condition probability distribution that the first quantity of feature points collide with the corresponding feature center points is determined. Therefore, for a specific implementation method for step S26 to S28, refer to the descriptions of corresponding parts in the foregoing embodiments.

Step S29: Obtain a first KL divergence between the feature condition probability distribution and the ideal condition probability distribution.

Step S210: Adjust configuration parameters of the CNN by using the first KL divergence, until a new first KL divergence obtained by using the adjusted configuration parameters meets a first similarity requirement.

To improve accuracy in classification on the training images, in this disclosure, the feature condition probability distribution obtained by using the feature points of the training images and the feature center points needs to match the ideal feature condition probability distribution. Therefore, the first similarity requirement in step S29 may be that a matching degree between an actually obtained feature condition probability distribution and the ideal feature condition probability distribution is greater than a threshold, that is, the feature condition probability distribution is very close to the ideal feature condition probability distribution, or the first similarity requirement may even be that the feature condition probability distribution is required to be the same as the ideal feature condition probability distribution.

Step S211: Use finally obtained respective feature center points of the images in the second quantity of categories as the target feature center points of the images of the corresponding categories.

Step S212: Separately binarize the first quantity of feature points and the second quantity of target feature center points.

In this embodiment, step S212 may be implemented by using formula (4), but not limited to this binarization processing method.

Step S213: Separately map the first quantity of binarized feature points and the second quantity of binarized target feature center points to a Hamming space, to obtain hash codes of the corresponding training images and hash center points of the images of the categories.

Step S214: Obtain a hash condition probability distribution that the hash codes of the training images match the hash center points of the images of the corresponding categories.

In this embodiment, a manner of obtaining the hash condition probability distribution is similar to the manner of obtaining the feature condition probability distribution. Therefore, with reference to formula (5), step S214 may include:

obtaining respective hash code distances between the first quantity of hash codes and the corresponding hash center points;

obtaining, by using the indicator function and the obtained hash code distances, hash condition probabilities that the first quantity of hash codes respectively collide with the corresponding hash center points; and determining, based on the obtained hash condition probabilities, the hash condition probability distribution that the first quantity of hash codes respectively collide with the corresponding hash center points.

Step S215: Adjust a hash condition probability configuration parameter according to a second similarity requirement between the hash condition probability distribution and the ideal condition probability distribution, to obtain an image hash model and respective target hash codes of the first quantity of training images.

A network training process in the Hamming space is similar to the network training process in the feature embedding space. Therefore, with reference to formula (6), step S215 may specifically include:

obtaining a second KL divergence between the hash condition probability distribution and the ideal condition probability distribution, and adjusting the hash condition probability configuration parameter by using the second KL divergence, until a new second KL divergence obtained by using the adjusted configuration parameter meets the second similarity requirement, to obtain the image hash model; and using first quantity of finally obtained hash codes as target hash codes of the corresponding training images.

As analyzed above, the center collision occurring in the feature embedding space and the Hamming space ensures consistence between center point similarities in the two spaces, thereby ensuring reliability and accuracy of image retrieval. In addition, in this disclosure, the formulas used in the foregoing steps for performing image feature extraction, feature mapping in the feature embedding space, and the processing method of the hash layer may further be used to form a hash function, and a hash function finally obtained through learning is used as an image hash model.

Step S216: Generate an image hash code database by using the target hash codes of the first quantity of training images.

It can be seen that, in this embodiment, efficient encoding on the training image library may be implemented through using center collision hash according to the foregoing method, to obtain the target hash codes of the training images; and the image hash code database is constructed by using the target hash codes of the training images, for image retrieval in an actual application scenario.

A storage manner of the target hash codes in the image hash code database is not limited in this disclosure. A plurality of hash code groups may be generated based on different feature center points and target hash codes corresponding to the feature center points, and the plurality of hash code groups form the image hash code database. That is, classification storage is performed on the target hash codes in the image hash code database, but this disclosure is not limited to this hash code storage manner.

Based on the above, in this disclosure, depth features of images may be extracted by using a deep learning network, and an image hash model may be obtained by using a center collision hash method. It can be seen that, for n training images and z center points, time complexity for this learning method in this disclosure is O(nz). Compared with the related art, this learning method greatly improves learning efficiency and shortens a training time. In addition, a global distribution of data can be learned, thereby improving accuracy of data outputted by the obtained image hash model.

Figure 4:
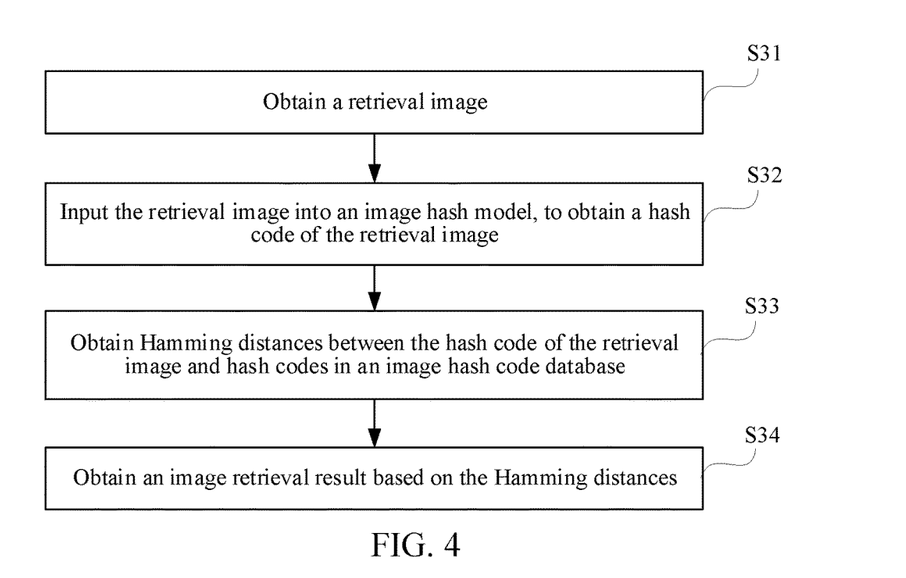
FIG. 4 is a schematic flowchart of another image processing method according to an embodiment of this disclosure.

Based on the foregoing embodiments, referring to a schematic flowchart of an embodiment of another image processing method shown in FIG. 4, this embodiment mainly describes a method for using the obtained image hash model and the image hash code database in an image retrieval application scenario. As shown in FIG. 4, the method may include the following steps:

Step S31: Obtain a retrieval image.

Step S32: Input the retrieval image into an image hash model, to obtain a hash code of the retrieval image.

Figure 5A:
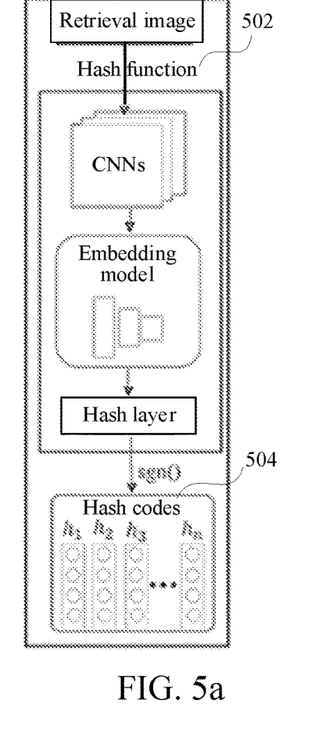
FIG. 5a is a schematic diagram of image retrieval application according to an embodiment of this disclosure.

An implementing process of inputting the retrieval image into the image hash model (that is, the hash function 502 shown in FIG. 5a) to obtain the corresponding hash code 504 is shown in FIG. 5a. For a processing process of the hash function, refer to the descriptions of corresponding parts in the foregoing embodiments.

In this disclosure, the image hash code database may further be updated by using the hash code of the retrieval image, to expand the image hash code database, thereby improving reliability and accuracy of image retrieval.

Step S33: Obtain Hamming distances between the hash code of the retrieval image and hash codes in the image hash code database.

Step S34: Obtain an image retrieval result by using lengths of the Hamming distances.

In this disclosure, image retrieval may be performed by using a K-nearest neighbor method of Hamming distances, but this disclosure is not limited to this image retrieval manner.

Figure 5B:
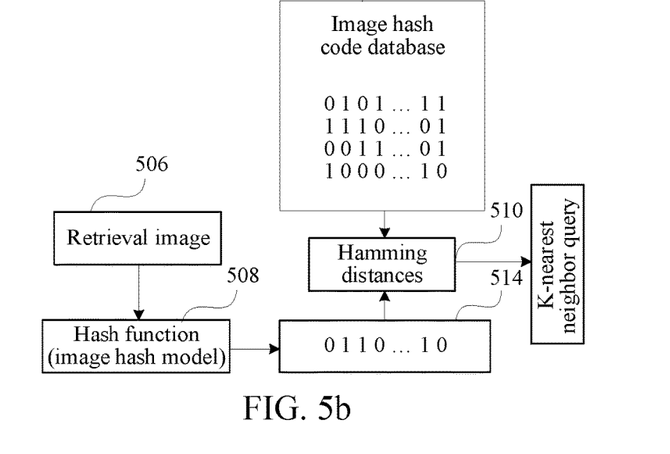
FIG. 5b is a schematic diagram of another image retrieval application according to an embodiment of this disclosure.

Based on the above, referring to the schematic diagram of application of image retrieval shown in FIG. 5b, in actual image retrieval application, a retrieval image 506 may be directly inputted into the foregoing hash function 508 obtained through learning, that is, the image hash model, to obtain a hash code 514 of the retrieval image 506; subsequently, Hamming distances 510 between the hash code 514 of the retrieval image 506 and hash codes in the image hash code database 512 are compared, and image retrieval is then performed in manners such as a k adjacent point, to obtain a retrieval result such as at least one image similar to a to-be-queried image required by the user, or at least one image dissimilar to the to-be-queried image required, to satisfy an image retrieval requirement of the user.

As analyzed above, during image retrieval in this embodiment, similarities between corresponding images are not obtained by directly using hash codes of the images. Instead, a hash code of an image and hash center points of categories of images are compared, to quickly and accurately obtain an image category to which the image belongs. That is, a training time is greatly shortened, and efficiency and accuracy of image classification retrieval is improved.

According to the image processing method provided in the embodiments of this disclosure, an embodiment of this disclosure further provides an image processing apparatus, including:

a communication module, configured to receive description information of a retrieval target;

a retrieval module, configured to determine a target hash code from an image hash code database according to the description information, each hash code in the image hash code database being obtained by learning an image by using an image hash model, the image hash model being a mathematical model that enables similar images to be projected to the same center point in a space; and a determining module, configured to determine the retrieval target from an image library according to the target hash code and a correspondence between images in the image library and the hash codes in the image hash code database.

In some implementations, the description information is in a form of text; and the retrieval module is specifically configured to:

determine, according to the description information, a category to which the retrieval target belongs;

determine a hash center point corresponding to the category; and determine the target hash code from the image hash code database according to the hash center point.

In some implementations, the description information is in a form of an image; and the retrieval module is specifically configured to:

determine a reference hash code according to the description information; and determine, from the image hash code database, the target hash code matching the reference hash code.

In some implementations, the communication module is specifically configured to:

receive the description information of the retrieval target inputted by a user by using a GUI; and the apparatus further includes:

a display module, configured to display the retrieval target by using the GUI.

In some implementations, the apparatus further includes:

a construction module, configured to construct an initial image hash model, the initial image hash model including a feature extraction network and a feature embedding network, the feature embedding network including a feature embedding layer and a hash layer, and a loss function of the initial image hash model being determined according to a first loss function used for projecting similar images to a feature space and/or a second loss function used for projecting similar images to a Hamming space; and a training module, configured to input the initial image hash model according to training images, and update parameters of the initial image hash model by using a loss value determined by using the loss function, to train the initial image hash model to obtain the image hash model.

In some implementations, the first loss function is determined according to a feature condition probability distribution and an ideal condition probability distribution, the feature condition probability distribution being used for representing a probability that a feature point is projected to a feature center point.

In some implementations, the second loss function is determined according to a hash condition probability distribution and an ideal condition probability distribution, the hash condition probability distribution being used for representing a probability that a hash code is projected to a hash center point.

In some implementations, the loss function of the initial image hash model is determined according to the first loss function used for projecting similar images to the feature space, the second loss function used for projecting similar images to the Hamming space, and a third loss function used for binarizing feature vectors of the feature space.

Figure 6:
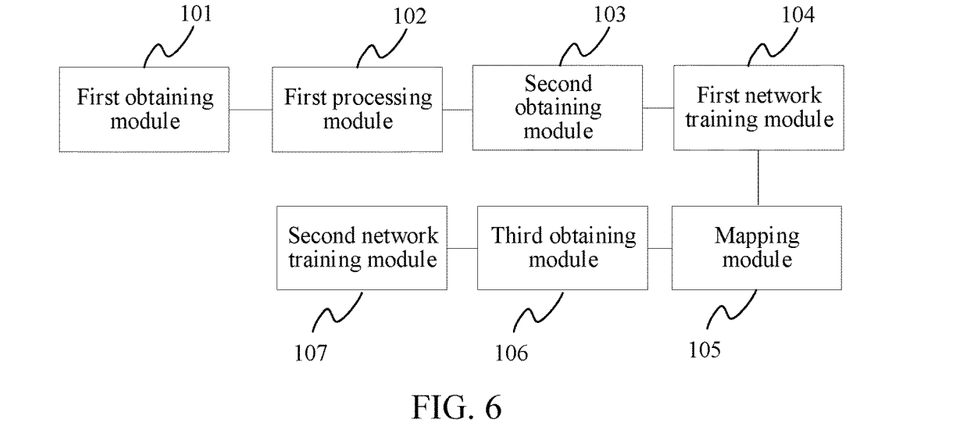
FIG. 6 is a schematic structural diagram of an image processing apparatus according to an embodiment of this disclosure.
Figure 7:
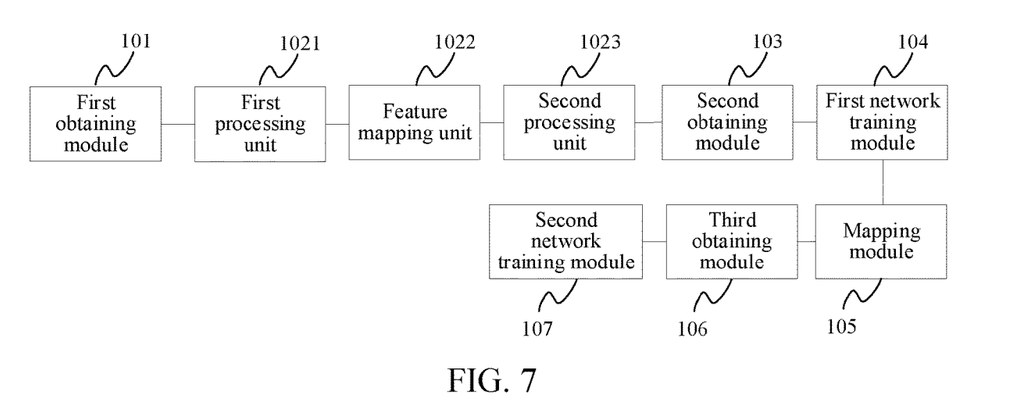
FIG. 7 is a schematic structural diagram of another image processing apparatus according to an embodiment of this disclosure.

FIG. 6 is a schematic structural diagram of an image processing apparatus according to an embodiment of this disclosure. The apparatus may be applied to a computer device. As shown in FIG. 6, the apparatus may include:

a first obtaining module 101, configured to obtain a first quantity of training images;

and a first processing module 102, configured to obtain, according to a CNN, feature points that respectively correspond to the first quantity of training images in a feature embedding space and respective feature center points of images in a second quantity of categories to which the first quantity of training images belong;

As shown in FIG. 7, the first processing module 102 may include:

a first processing unit 1021, configured to input the first quantity of training images into the CNN, to obtain respective image features of the first quantity of training images;

a feature mapping unit 1022, configured to map the respective image features of the first quantity of training images to the feature embedding space, to obtain the feature points of the corresponding training images; and a second processing unit 1023, configured to obtain, by using a learning result of a fully connected layer of the CNN, the respective feature center points of the images in the second quantity of categories to which the first quantity of training images belong.

The apparatus may further include: a second obtaining module 103, configured to obtain a feature condition probability distribution that the first quantity of feature points collide with the corresponding feature center points and a preset ideal condition probability distribution.

The apparatus may further include:

an annotation module, configured to obtain labels respectively annotated on the first quantity of training images, labels annotated on similar training images being the same; and an indicator function obtaining module, configured to obtain, according to the labels, an indicator function indicating whether training images are similar.

Correspondingly, the second obtaining module 103 may include:

a first obtaining unit, configured to obtain respective feature distances between the first quantity of feature points and the corresponding feature center points;

a second obtaining unit, configured to obtain, by using the indicator function and the obtained feature distances, feature condition probabilities that the first quantity of feature points respectively collide with the corresponding feature center points; and a first determining unit, configured to determine, based on the obtained feature condition probabilities, the feature condition probability distribution that the first quantity of feature points collide with the corresponding feature center points.

In this embodiment, a result of the ideal condition probability distribution may indicate that: similar training images are mapped to corresponding center points, and dissimilar training images are mapped to different center points, the center points including the feature center points and the hash center points.

The apparatus may further include: a first network training module 104, configured to perform network training by using the feature condition probability distribution and the ideal condition probability distribution, to obtain respective target feature center points of the images in the second quantity of categories.

The first network training module 104 may be specifically configured to adjust configuration parameters of the CNN according to a first similarity requirement between the feature condition probability distribution and the ideal condition probability distribution, to obtain the respective target feature center points of the images in the second quantity of categories.

In this embodiment, the first network training module 104 may include:

a third obtaining unit, configured to obtain a first KL divergence between the feature condition probability distribution and the ideal condition probability distribution;

a first adjustment unit, configured to adjust the configuration parameters of the CNN by using the first KL divergence, until a new first KL divergence obtained by using the adjusted configuration parameters meets the first similarity requirement; and a second determining unit, configured to use finally obtained respective feature center points of the images in the second quantity of categories as the target feature center points of the images of the corresponding categories.

The apparatus may further include: a mapping module 105, configured to separately map the first quantity of feature points and the second quantity of target feature center points to a Hamming space, to obtain respective hash codes of the first quantity of training images and respective hash center points of the images in the second quantity of categories.

The apparatus may further include: a third obtaining module 106, configured to obtain a hash condition probability distribution that the first quantity of hash codes collide with the corresponding hash center points.

The third obtaining module 106 may include:

a fourth obtaining unit, configured to obtain respective hash code distances between the first quantity of hash codes and the corresponding hash center points;

a fifth obtaining unit, configured to obtain, by using the indicator function and the obtained hash code distances, hash condition probabilities that the first quantity of hash codes respectively collide with the corresponding hash center points; and a third determining unit, configured to determine, based on the obtained hash condition probabilities, the hash condition probability distribution that the first quantity of hash codes respectively collide with the corresponding hash center points.

The apparatus may further include: a second network training module 107, configured to perform network training by using the hash condition probability distribution and the ideal condition probability distribution, to obtain an image hash model.

In this embodiment, the second network training module 107 may be specifically configured to adjust a hash condition probability configuration parameter according to a second similarity requirement between the hash condition probability distribution and the ideal condition probability distribution, to obtain an image hash model.

The second network training module 107 may include:

a sixth obtaining unit, configured to obtain a second KL divergence between the hash condition probability distribution and the ideal condition probability distribution, and a second adjustment unit, configured to adjust the hash condition probability configuration parameter by using the second KL divergence, until a new second KL divergence obtained by using the adjusted configuration parameter meets the second similarity requirement; and a fourth determining unit, configured to use first quantity of finally obtained hash codes as target hash codes of the corresponding training images.

Figure 8:
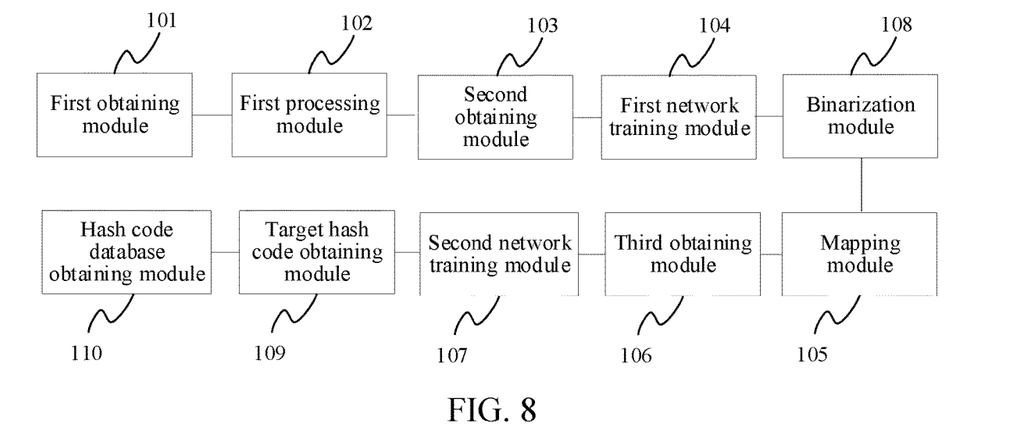
FIG. 8 is a schematic structural diagram of another image processing apparatus according to an embodiment of this disclosure.

Based on the foregoing embodiments, as shown in FIG. 8, the apparatus may further include:

a binarization module 108, configured to separately binarize the first quantity of feature points and the second quantity of target feature center points.

Correspondingly, the mapping module 105 may be specifically configured to separately map the first quantity of binarized feature points and the second quantity of binarized target feature center points to the Hamming space, to obtain the respective hash codes of the first quantity of training images and the respective hash center points of the images in the second quantity of categories.

Based on the foregoing embodiments, as shown in FIG. 8, the apparatus may further include:

a target hash code obtaining module 109, configured to adjust a hash condition probability configuration parameter according to a second similarity requirement between the hash condition probability distribution and the ideal condition probability distribution, to obtain respective target hash codes of the first quantity of training images; and a hash code database obtaining module 110, configured to construct an image hash code database by using the first quantity of obtained target hash codes.

Figure 9:
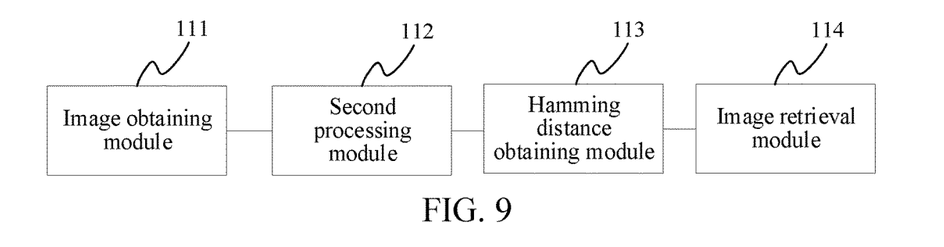
FIG. 9 is a schematic structural diagram of another image processing apparatus according to an embodiment of this disclosure.

Based on the foregoing embodiments, as shown in FIG. 9, the apparatus may further include:

an image obtaining module 111, configured to obtain a retrieval image;

a second processing module 112, configured to input the retrieval image into the image hash model, to obtain a hash code of the retrieval image;

a Hamming distance obtaining module 113, configured to obtain Hamming distances between the hash code of the retrieval image and hash codes in the image hash code database; and an image retrieval module 114, configured to obtain an image retrieval result by using lengths of the Hamming distances.

This disclosure further provides an embodiment of a storage medium, the storage medium storing a computer program, the computer program being executed by a processor to implement the steps of the foregoing image processing method. For an implementation process of the image processing method, refer to the descriptions in the foregoing method embodiments.

Figure 10:
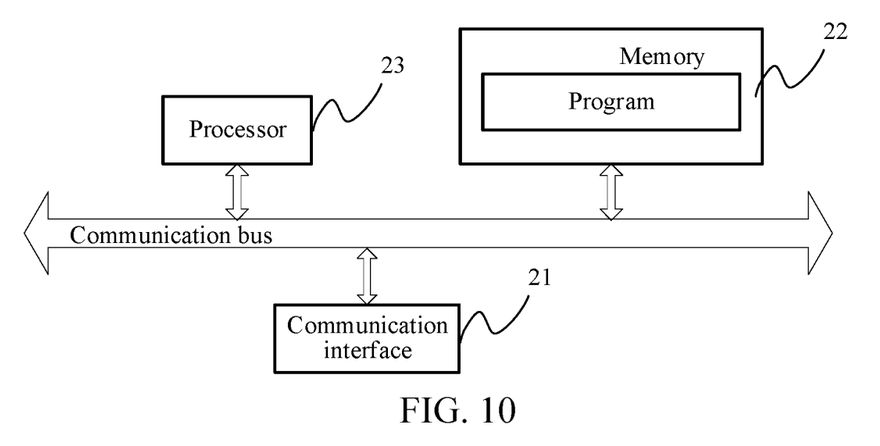
FIG. 10 is a schematic structural diagram of a computer device according to an embodiment of this disclosure.

As shown in FIG. 10, an embodiment of this disclosure further provides a schematic structural diagram of hardware of a computer device. The computer device may be a server that implements the foregoing image processing method, a terminal device, or the like. A product type of the computer device is not limited in this disclosure. As shown in FIG. 10, the computer device may include a communication interface 21, a memory 22, and a processor 23.

In this embodiment of this disclosure, the communication interface 21, the memory 22, and the processor 23 may communicate with each other by using a communication bus, and there may be at least one communication interface 21, at least one memory 22, at least one processor 23, and at least one communication bus.

The communication interface 21 may be an interface of a communication module, for example, an interface of a GSM module.

The processor 23 may be a central processing unit (CPU) or an application-specific integrated circuit (ASIC) or may be configured as one or more integrated circuits for implementing the embodiments of this disclosure.

The memory 22 may include a high-speed random access memory (RAM), or may further include a non-volatile memory, for example, at least one magnetic disk storage.

The memory 22 stores a program, and the processor 23 invokes the program stored in the memory 22, to implement steps of the foregoing image processing method applicable to the computer device. For a specific implementation process, refer to the descriptions of corresponding parts in the foregoing method embodiments.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The embodiments in this specification are all described in a progressive manner. Description of each of the embodiments focuses on differences from other embodiments, and reference may be made to each other for the same or similar parts among the embodiments. The embodiments of the apparatus and the computer device correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it shall not be considered that the implementation goes beyond the scope of this disclosure.

In combination with the embodiments disclosed herein, steps of the method or algorithm described may be directly implemented by using hardware, a software module executed by a processor, or the combination thereof. The software module may be placed in a RAM, a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use this disclosure. Various modifications to the embodiments are obvious to a person skilled in the art, and general principles defined in this specification may be implemented in other embodiments without departing from the spirit or scope of this disclosure. Therefore, this disclosure is not limited to these embodiments illustrated in this specification, but needs to conform to the broadest scope consistent with the principles and novel features disclosed in this specification.

What is claimed is:

1. An image processing method, the method comprising:
receiving description information of a retrieval target;
determining a target hash code from an image hash code database according to the description information, each hash code in the image hash code database being obtained by learning an image using an image hash model, the image hash model enabling similar images to be projected to a same feature center point in a feature space and a same hash center point in a Hamming space; and
determining the retrieval target from an image library according to the target hash code and a correspondence between images in the image library and the hash codes in the image hash code database.

2. The method of claim 1, wherein the description information is in a form of text, and
the determining the target hash code from the image hash code database according to the description information comprises:

determining a category to which the retrieval target belongs according to the description information;

determining a hash center point corresponding to the category; and determining the target hash code from the image hash code database according to the hash center point.

3. The method of claim 1, wherein the description information is in a form of an image, and the determining the target hash code from the image hash code database according to the description information comprises:

determining a reference hash code according to the description information; and determining, from the image hash code database, the target hash code matching the reference hash code.

4. The method of claim 1, wherein the receiving the description information of the retrieval target comprises:

receiving the description information of the retrieval target inputted by a user using a graphical user interface (GUI); and the method further comprises:

displaying the retrieval target by using the GUI.

5. The method of claim 1, further comprising:

constructing an initial image hash model, the initial image hash model comprising a feature extraction network and a feature embedding network, the feature embedding network comprising a feature embedding layer and a hash layer, and a loss function of the initial image hash model being determined according to a first loss function projecting similar images to a feature space or a second loss function projecting similar images to a Hamming space; and inputting the initial image hash model according to training images, and updating parameters of the initial image hash model based on a loss value determined by using the loss function, to train the initial image hash model to obtain the image hash model.

6. The method of claim 5, wherein the first loss function is determined according to a feature condition probability distribution and an ideal condition probability distribution, the feature condition probability distribution being used for representing a probability that a feature point is projected to a feature center point.

7. The method of claim 5, wherein the second loss function is determined according to a hash condition probability distribution and an ideal condition probability distribution, the hash condition probability distribution representing a probability that a hash code is projected to a hash center point.

8. The method of claim 5, wherein the loss function of the initial image hash model is determined according to the first loss function projecting similar images to the feature space, the second loss function projecting similar images to the Hamming space, and a third loss function binarizing feature vectors of the feature space.

9. An image processing apparatus, comprising:

a memory operable to store computer-readable instructions; and a processor operable to read the computer-readable instructions, the processor when executing the computer-readable instructions is configured to:

receive description information of a retrieval target;

determine a target hash code from an image hash code database according to the description information, each hash code in the image hash code database being obtained by learning an image using an image hash model, the image hash model enabling similar images to be projected to a same feature center point in a feature space and a same hash center point in a Hamming space; and determine the retrieval target from an image library according to the target hash code and a correspondence between images in the image library and the hash codes in the image hash code database.

10. A non-transitory computer-readable storage medium, having processor executable instructions stored thereon for causing a processor to:

receive description information of a retrieval target;

determine a target hash code from an image hash code database according to the description information, each hash code in the image hash code database being obtained by learning an image using an image hash model, the image hash model enabling similar images to be projected to a same feature center point in a feature space and a same hash center point in a Hamming space; and determine the retrieval target from an image library according to the target hash code and a correspondence between images in the image library and the hash codes in the image hash code database.

* * * * *